United States Patent
Simms

(10) Patent No.: US 11,863,091 B2
(45) Date of Patent: Jan. 2, 2024

(54) MOTOR VOLTAGE SYNTHESIS IN REDUCED VOLTAGE SOFT STARTERS AND MOTOR STARTERS EMPLOYING THE SAME

(71) Applicant: Eaton Intelligent Power Limited, Dublin (IE)

(72) Inventor: Stan Rex Simms, Arden, NC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/658,509

(22) Filed: Apr. 8, 2022

(65) Prior Publication Data

US 2023/0327593 A1 Oct. 12, 2023

(51) Int. Cl.
| | |
|---|---|
| H02P 21/34 | (2016.01) |
| H02P 21/22 | (2016.01) |
| H02P 21/20 | (2016.01) |

(52) U.S. Cl.
CPC .............. *H02P 21/34* (2016.02); *H02P 21/20* (2016.02); *H02P 21/22* (2016.02); *H02P 2207/01* (2013.01)

(58) Field of Classification Search
CPC .......... H02P 21/34; H02P 21/20; H02P 21/22; H02P 2207/01; H03M 1/0881; G05B 2219/43048
See application file for complete search history.

(56) References Cited

U.S. PATENT DOCUMENTS

| | | | | |
|---|---|---|---|---|
| 2009/0051311 A1* | 2/2009 | Lu | ............. | H02P 23/14 318/806 |
| 2014/0002117 A1* | 1/2014 | Woodley | ............. | H02P 1/423 324/750.01 |
| 2015/0333663 A1* | 11/2015 | Wei | ............. | H02P 27/047 318/430 |
| 2015/0333685 A1* | 11/2015 | Wei | ............. | H02P 21/34 318/430 |

FOREIGN PATENT DOCUMENTS

| | | | | |
|---|---|---|---|---|
| CN | 102064749 B | * | 3/2013 | |
| EP | 2388917 A2 | * | 11/2011 | ............. H02H 9/001 |
| KR | 2020100916 A | * | 8/2020 | |

* cited by examiner

*Primary Examiner* — Bickey Dhakal
(74) *Attorney, Agent, or Firm* — Stanek Lemon Crouse & Meeks, P.A.

(57) ABSTRACT

A reduced voltage soft starter (RVSS) includes a switching circuit configured to selectively couple an AC power source to a motor and a control circuit configured to sense a line voltage provided to the switching circuit to produce a first voltage signal, to sense a current of the motor to generate a current signal and to generate a second voltage signal representative of a voltage of the motor responsive to the first voltage signal and the current signal. The control circuit may be further configured to generate an estimate of a torque of the motor responsive to the second voltage signal and to control the torque of the motor responsive to the torque estimate.

16 Claims, 5 Drawing Sheets

MOTOR VOLTAGE SYNTHESIS IN REDUCED VOLTAGE SOFT STARTERS AND MOTOR STARTERS EMPLOYING THE SAME

BACKGROUND

Motor starters are commonly used with industrial electric motors. Typical solid-state motor starters control starting characteristics to meet application requirements, including acceleration and deceleration time, starting current and motor torque. Soft starters are commonly used to limit inrush current when the motor is first coupled to a power source, as large inrush currents may cause voltage dips that may negatively affect other loads coupled to the same source. Starters may also limit starting torque, as high starting torque may cause electromechanical shock that can damage windings and other components of the motor, as well as drive trains and other components mechanically coupled to the motor.

A reduced-voltage soft starter (RVSS) may use a switching circuit including pairs of silicon-controlled rectifiers (SCRs) that are connected in series between an AC power source and the load. The SCRs may be phase controlled to apply a reduced RMS voltage to the motor during startup. Typically, the RMS voltage is ramped up to the normal operating RMS voltage at a preset rate.

An RVSS may employ a torque controller to control torque of the motor during ramping. Such a controller may sense the line voltage to the input of the RVSS, the voltage at the motor and the motor current, and responsively generate a torque estimate that is used as a feedback signal for a torque control loop. An example of such torque control is described in "Soft Starting of Induction Motor with Torque Control" by Nied et al, *IEEE Transactions on Industry Applications* (May/June 2010).

SUMMARY

Some embodiments provide methods of operating a reduced voltage soft starter (RVSS) that drives a motor. The methods include sensing a line voltage provided to the RVSS to produce a first voltage signal. A current of the motor is sensed to generate a current signal. A second voltage signal representative of a voltage of the motor is generated responsive to the first voltage signal and the current signal.

Generating the second voltage signal may include generating a load-side voltage signal from the first voltage signal and processing the load-side voltage signal responsive to the current signal to compensate for switching by the RVSS. Generating the load-side voltage signal may include transforming the first voltage signal according to an ABC-dq0 transformation at a first angle to generate a component signal, scaling the component signal, and transforming the scaled component signal according to a dq0-ABC transformation at a second angle to generate load-side line-to-neutral voltage signals for respective phases. Processing the load-side voltage signal responsive to the current signal may include processing the load-side line-to-neutral voltage signals responsive to the current signal to compensate for switching by the RVSS.

The current signal may include respective phase current signals for respective phases and processing the load-side line-to-neutral voltage signal may include detecting when the phase currents are within detection windows around zero current levels and notching the load-side line-to-neutral voltage signals based on the phase currents during the detection windows. Scaling the component signal may be preceded by generating a root mean square (RMS) component signal from the component signal, scaling the component signal may include scaling the RMS component signal, and transforming the scaled component signal according to the dq0-ABC transformation may include transforming the scaled RMS component signal.

The current signal may include respective phase current signals for respective phases. Generating a load-side voltage signal may include generating respective load-side line-to-neutral voltage signals for respective phases. Processing the load-side voltage signal may include detecting when the phase currents are within detection windows around zero current levels and notching the load-side line-to-neutral voltage signals based on the phase currents during the detection windows to generate respective line-to-neutral voltage signals representative of respective line-to-neutral voltages of the motor.

The methods may further include generating an estimate of a torque of the motor responsive to the second voltage signal. The methods may also include controlling the torque of the motor responsive to the torque estimate. Estimating the torque may include generating an instantaneous torque estimate and generating an RMS torque estimate from the instantaneous torque estimate. Controlling the torque may include controlling the torque responsive to the RMS torque estimate.

Further embodiments provide an RVSS including a switching circuit configured to selectively couple an AC power source to a motor and a control circuit configured to sense a line voltage provided to the switching circuit to produce a first voltage signal, to sense a current of the motor to generate a current signal and to generate a second voltage signal representative of a voltage of the motor responsive to the first voltage signal and the current signal. The control circuit may be configured to generate a load-side voltage signal from the first voltage signal and to process the load-side voltage signal responsive to the current signal to compensate for switching by the switching circuit. The control circuit may be configured transform the first voltage signal according to an ABC-dq0 transformation at a first angle to generate a component signal, to scaling the component signal, and to transform the scaled component signal according to a dq0-ABC transformation at a second angle to generate load-side line-to-neutral voltage signals for respective phases. The control circuit may be configured to generate the second voltage signal by processing the load-side line-to-neutral voltage signals responsive to the current signal to compensate for switching by the switching circuit.

In some embodiments, the current signal may include respective phase current signals for respective phases. The control circuit may be configured to detect when the phase currents are within detection windows around zero current levels and to notch the load-side line-to-neutral voltage signals based on the phase current. The control circuit may be configured to generate a root mean square (RMS) component signal from the component signal, to scale the RMS component signal and to transform the scaled RMS component signal according to the dq0-ABC transformation to generate the load-side line-to-neutral voltage signals.

The current signal may include respective phase current signals for respective phases, and the control circuit may be configured to generate respective load-side line-to-neutral voltage signals for respective phases, to detect when the phase currents are within detection windows around zero current levels, and to notch the load-side line-to-neutral voltage signals based on the phase currents to generate respective line-to-neutral voltage signals representative of respective line-to-neutral voltages of the motor.

The control circuit may be further configured to generate an estimate of a torque of the motor responsive to the second voltage signa. The control circuit may be configured to control the torque of the motor responsive to the torque estimate. The control circuit may be configured to generate an instantaneous torque estimate, to generate an RMS torque estimate from the instantaneous torque estimate and to control the torque responsive to the RMS torque estimate.

DETAILED DESCRIPTION

Figure 1:
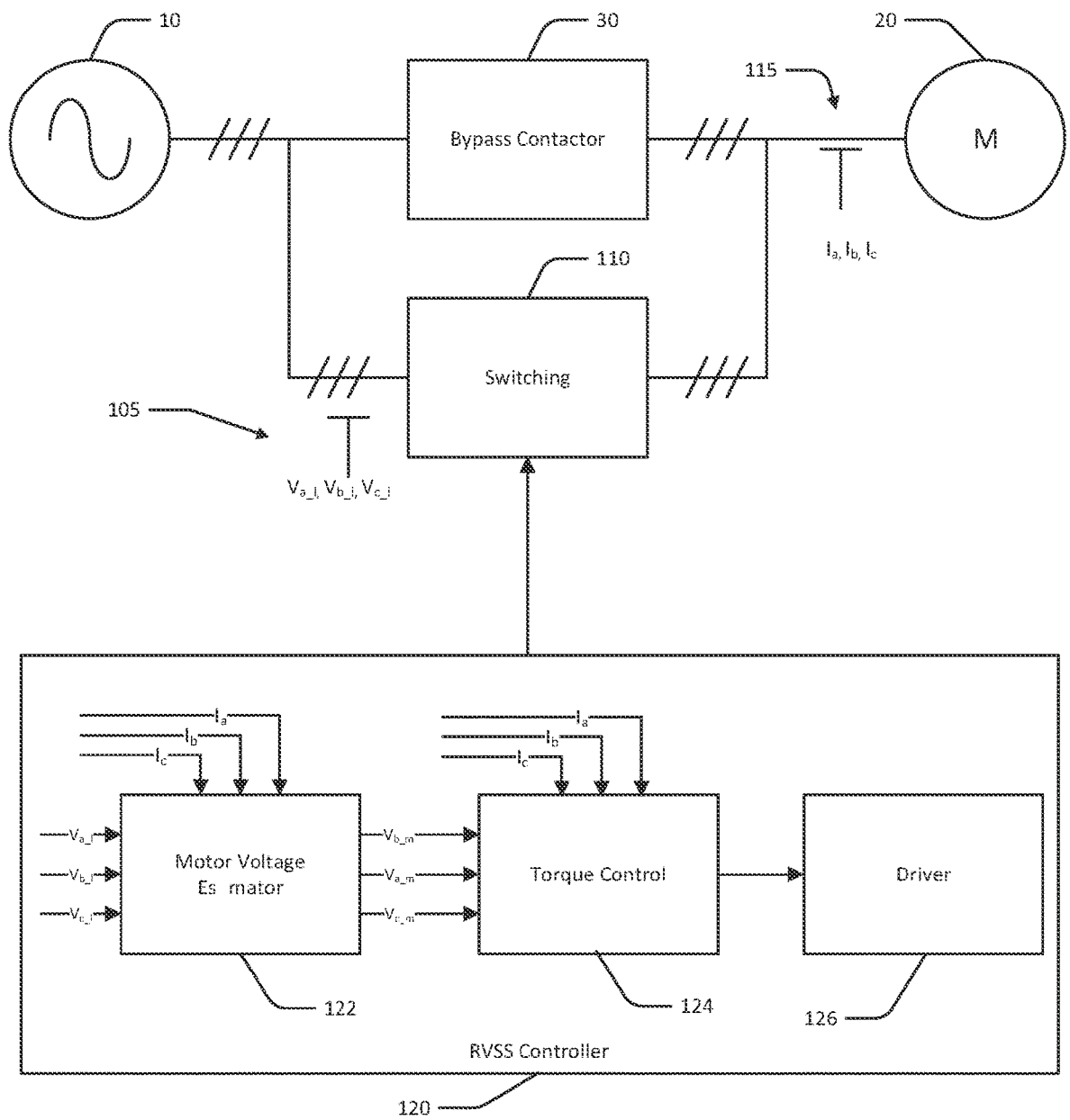
FIG. 1 illustrates a motor starter apparatus according to some embodiments of the inventive subject matter.

The inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Some embodiments of the inventive concept arise from a realization that, in reduced voltage soft starters (RVSSs), metering and control applications (e.g, torque control) may be implemented using an estimate of motor voltage synthesized from line voltage and motor current, thus eliminating the need to directly sense the motor voltage. In some embodiments, the input line-to-line voltage is converted using an ABC-dq0 transformation. The output (e.g., a "d" output or equivalent thereof) of the transformation is processed to determine an RMS value that accounts for voltage drop in the line impedance upstream of the RVSS. The RMS value is scaled for conversion from line-to-line voltage to line-to-neutral voltage and provided to a dq0-ABC converter with a 30 degree phase shift with respect to the original ABC-dq0 conversion to produce sinusoidal line-to-neutral reference voltage signals.

Motor phase current signals may then be used to "notch" (i.e., selectively correct for times when the RVSS switches are blocking or commutating) these reference voltage signals to generate line-to-neutral voltage signals representative of the actual line-to-neutral motor voltages. This processing may involve using window comparators to detect nulls in the phase currents and adjusting the line-to-neutral reference voltages accordingly so that they reflect the effects of switching by the SCRs of the RVSS. In some embodiments, the thresholds of the windows may be about 10% to about 15% of the rated full load current of the motor. The estimated motor line-to-neutral voltage signals may be used, for example, to develop electromagnetic torque estimates for motor torque control. They can also be used for metering and other purposes.

FIG. 1 illustrates apparatus according to some embodiments. An RVSS includes a switching circuit 110 connected between an AC power source 10 and a motor 20. The switching circuit may include pairs of antiparallel-connected silicon-controlled rectifiers (SCRs) for each motor phase. A bypass contactor 130 is configured to bypass the switching circuit 110 and directly couple the AC power source 10 to the motor 20. A control circuit 120 controls the switching circuit 110 and the bypass contactor 130.

The control circuit 120 includes a motor voltage estimator circuit 122 which is configured to receive voltage signals $V_{a\_1}, V_{b\_1}, V_{c\_1}$ representing the line voltage applied to the switching circuit 110 and current signals $I_a, I_b, I_c$ representing motor currents, which are sensed by an input voltage sensor 105 and an output current sensor 115, respectively. The motor voltage estimator circuit 122 responsively generates motor voltage signals $V_{a\_m}$, $V_{b\_m}$, $V_{c\_m}$ representative of line-to-neutral voltages at the motor 20. Along with the motor current signals $I_a$, $I_b$, $I_c$, these may be applied to a torque control circuit 124, which controls a driver circuit 126 that fires the SCRs of the switching circuit 110.

Figure 2:
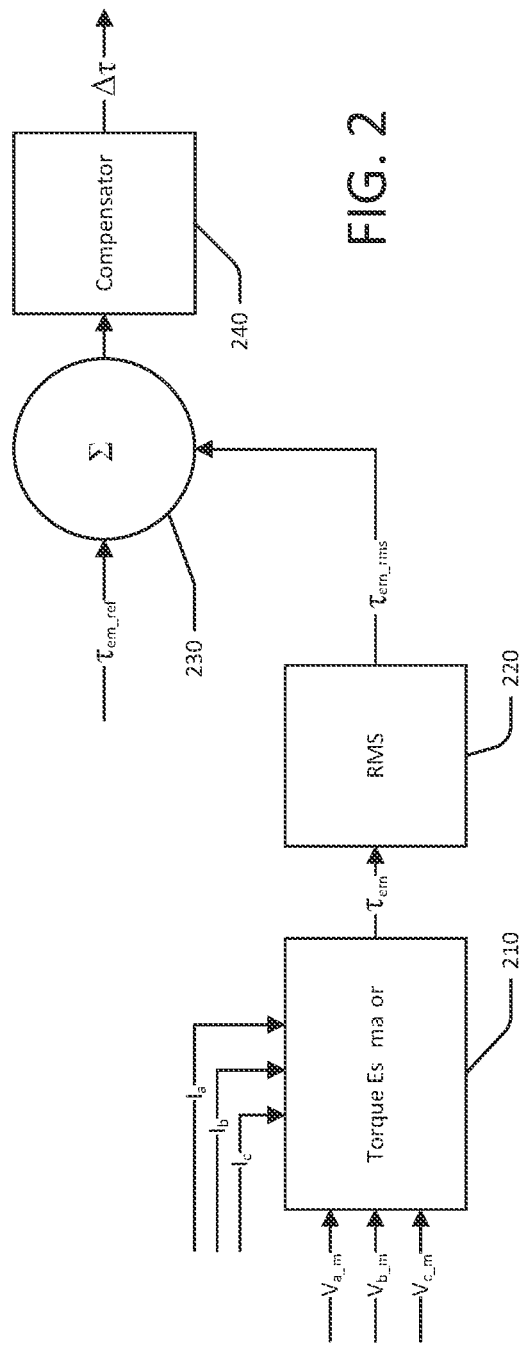
FIG. 2 illustrates a torque control arrangement for the motor starter apparatus of FIG. 1 according to some embodiments.

Referring to FIG. 2, the torque control circuit 124 of FIG. 1 may include a torque estimator circuit 210 that is configured to generate an instantaneous electromagnetic torque estimate signal $\tau_{em}$. An RMS circuit 220 generates an RMS torque signal $\tau_{em\_rms}$ from the instantaneous electromagnetic torque estimate signal $\tau_{em}$. The RMS torque signal $\tau_{em\_rms}$ may be compared with a torque reference signal $\tau_{em}$ ref by a summing circuit 230 to generate an error signal $\Delta\tau$ that is applied to torque compensator circuit 240, which may responsively provide a command signal to the driver circuit 126 shown in FIG. 1.

Figure 3:
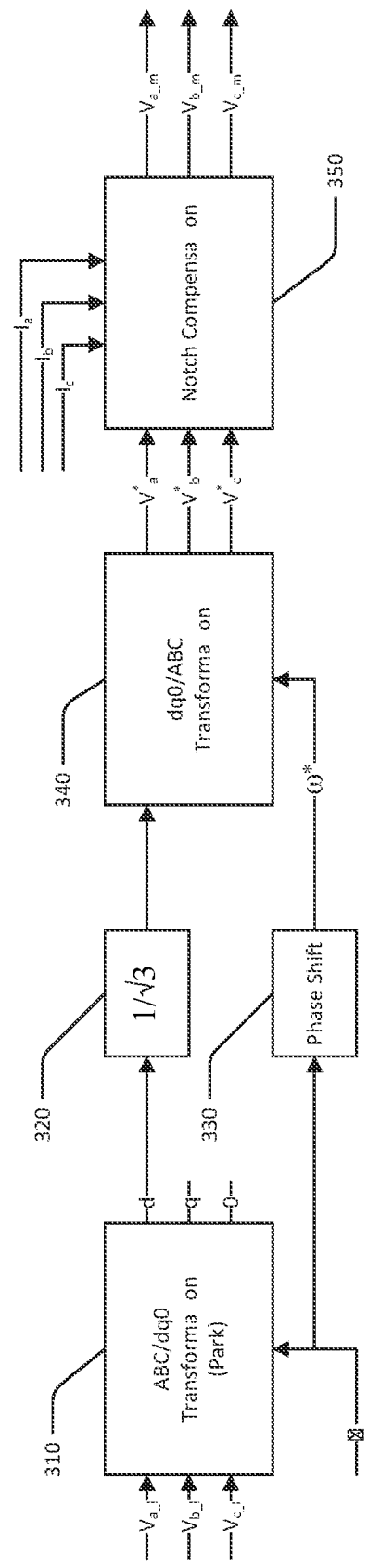
FIG. 3 illustrates apparatus and operations for motor voltage synthesis for the apparatus of FIG. 1 according to some embodiments.

FIG. 3 illustrates apparatus and operations of torque estimator circuit according to some embodiments. The line voltage signals $V_{a\_1}$, $V_{b\_1}$, $V_{c\_1}$ are applied to an ABC/dq0 converter circuit 310, which generates corresponding dq0 component signals d, q, 0 using a phase angle ω. The d component signal d is divided by the square root of 3 by a scaling circuit 320 and the result applied to a dq0/ABC converter circuit 340, which generates pre-compensated line-to-neutral voltage signals $V^*_a$, $V^*_b$, $V^*_c$ using a phase angle ω* that is shifted by 30 degrees with respect to the phase angle ω by a phase shift circuit 330. The line-to-neutral voltage signals line-to-neutral voltage signals $V^*_a$, $V^*_b$, $V^*_c$ are provided to a notch compensation circuit 350, which selectively introduces notches into the line-to-neutral voltage signals $V^*_a$, $V^*_b$, $V^*_c$ responsive to the motor current signals $I_a$, $I_b$, $I_c$ to generate estimated motor voltage signals $V_{a\_m}$, $V_{b\_m}$, $V_{c\_m}$ that represent the line-to-neutral voltages of the motor 20.

Figure 4:
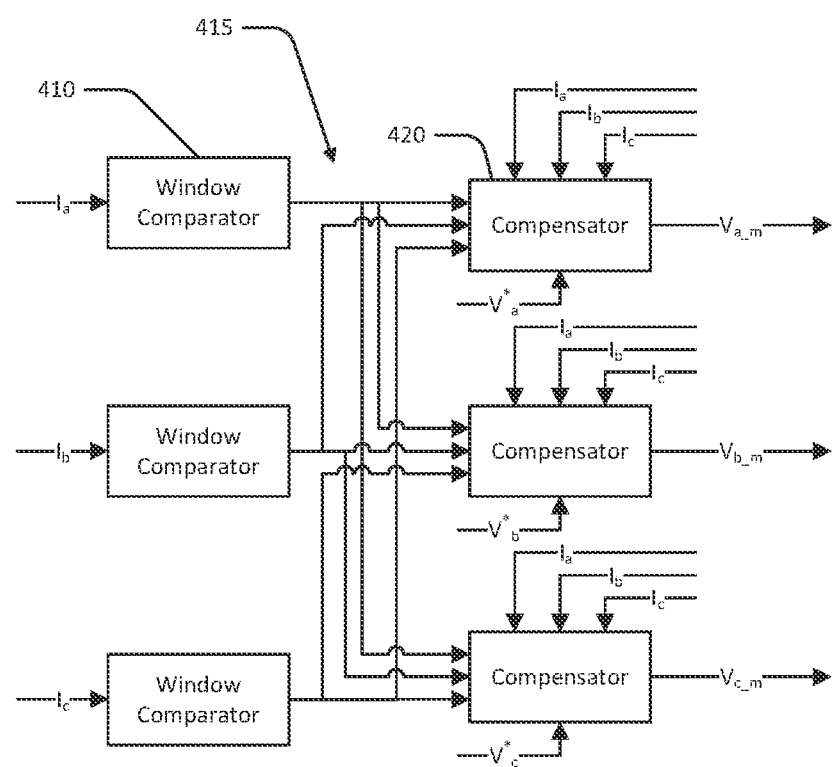
FIG. 4 illustrates apparatus and operations for notch and back EMF compensation according to some embodiments.

FIG. 4 illustrates notch detection and compensation circuitry according to some embodiments. The motor current signals $I_a$, $I_b$, $I_c$ are provided to respective window comparator circuits 410, which detect nulls in these currents based on whether these current signals are inside or outside of windows defined by upper and lower thresholds around zero. Comparison signals 415 generated by the window comparator circuits 410 are provided to compensator circuits 420, which also receive the motor current signals $I_a$, $I_b$, $I_c$ and respective ones of the line-to-neutral voltage signals $V^*_a$, $V^*_b$, $V^*_c$. Responsive to the comparison signals 415, receive the motor current signals $I_a$, $I_b$, $I_c$ and respective ones of the line-to-neutral voltage signals $V^*_a$, $V^*_b$, $V^*_c$, the compensator circuits 420 generate respective ones of the motor voltage signals $V_{a\_m}$, $V_{b\_m}$, $V_{c\_m}$.

FIG. 4 is a flowchart illustrating representative operations for generating an estimated a-phase motor voltage signal $V_{a\_m}$ value according to some embodiments. If the a-phase current signal $I_a$ is within the associated detection window, the estimated motor voltage signal $V_{a\_m}$ is set (notched) to a value equal to 0.5 times the product of the b-phase current signal $I_b$ and a stator inductance Ls of the motor and the updated value for the a-phase motor voltage signal $V_{a\_m}$ is provided to the torque estimator (blocks 510, 520, 580). The stator inductance Ls may be based, for example, on a heuristic rule of thumb, a locked rotor code, or motor parameter identification.

Figure 5:
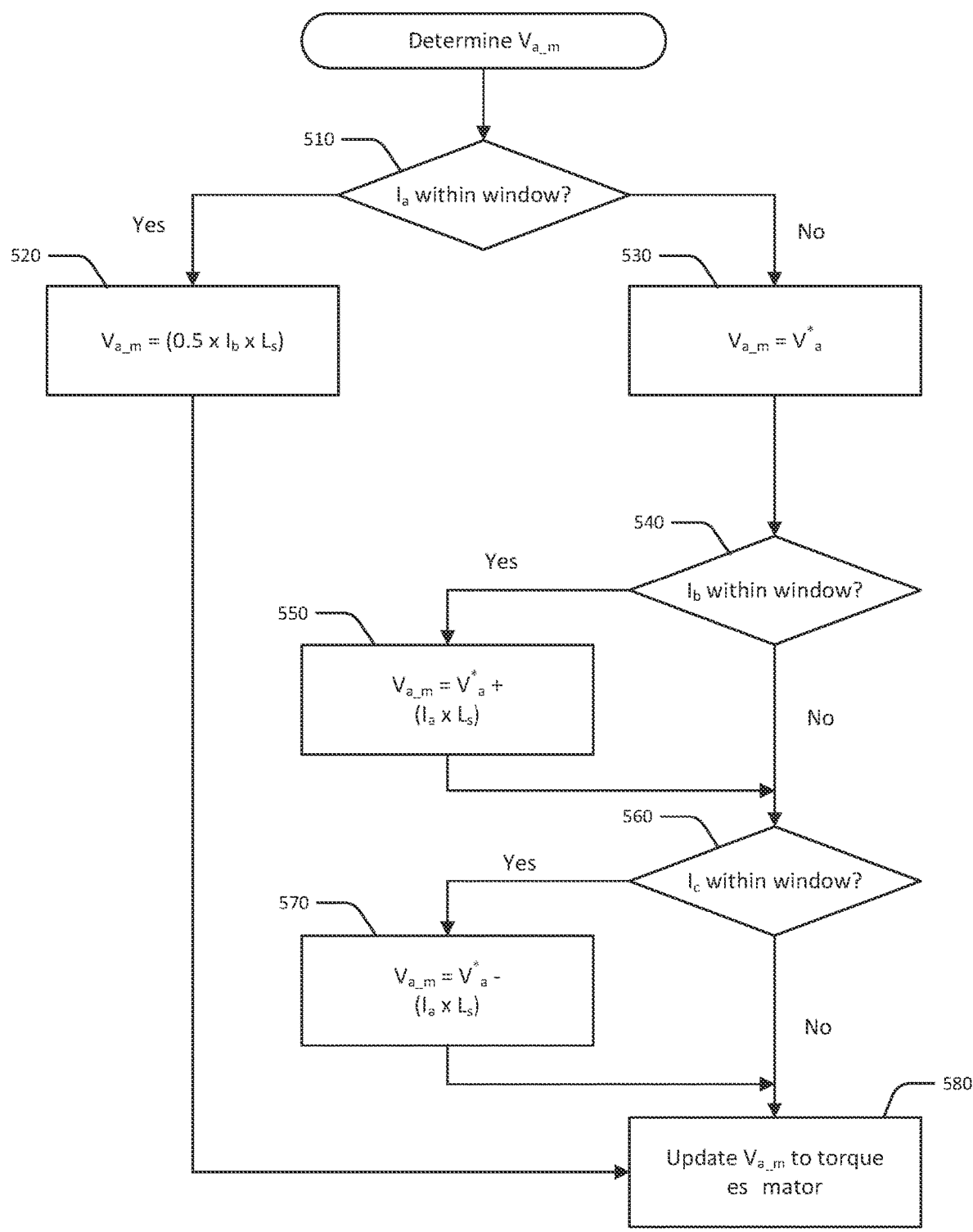
FIG. 5 is a flowchart illustrating operations of the notch and back EMF compensation of FIG. 5 according to further embodiments.
Figure 6:
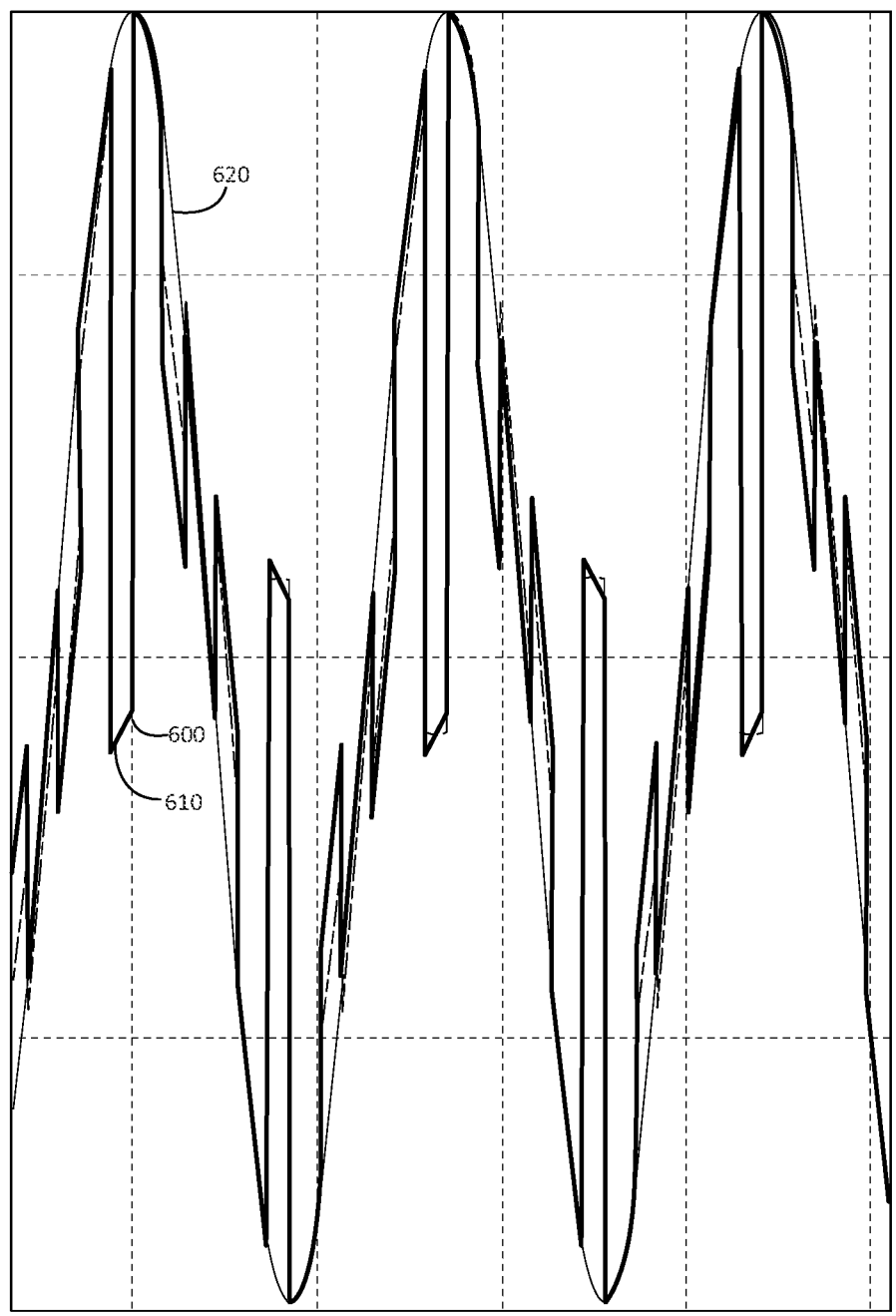
FIG. 6 is a waveform diagram illustrating an estimated motor voltage according to some embodiments.

If the a-phase current signal $I_a$ is not within the window, the a-phase motor voltage signal $V_{a\_m}$ may be set to the current value of the pre-compensated line-to-neutral voltage signal $V^*_a$ (blocks 510, 530). If either of the b-phase or c-phase current signals $I_b$, $I_c$ is within their corresponding null detection windows, the motor voltage signal $V_a$ m is set to a value equal to the pre-compensated line-to-neutral voltage signal $V^*_a$ corrected by factors equal to the a-phase current signal $I_a$ multiplied by the stator inductance Ls (blocks 540, 550, 560, 570). The estimated motor voltage signal $V_{a\_m}$ value is provided to the torque estimator (block 580). The b- and c-phase estimated motor voltage signals $V_{b\_m}$, $V_{c\_m}$ may be generated in a comparable manner. In particular, the b-phase estimated motor voltage signal $V_{b\_m}$ may be set to a value equal to 0.5 times the product of the c-phase current signal $I_c$ for nulls of the b-phase current $I_b$, and c-phase estimated motor voltage signal $V_{c\_m}$ may be set to a value equal to 0.5 times the product of the a-phase current signal $I_a$ for nulls of the c-phase current $I_c$. Corrections to the pre-compensated voltage signals $V^*_a$, $V^*_b$, $V^*_c$ are made for nulls in the other phase currents along the lines described with reference to FIG. 5. FIG. 6 illustrates an estimated motor voltage 600 generated using such operations, in comparison to a measured motor voltage 610 and the line-to-line voltage 620 of the AC source.

Apparatus described herein may be implemented using electrical circuitry that implements various control structures. It will be understood that such circuitry may include analog and digital circuitry. Components referred to herein as "circuits" may be implemented using analog circuitry, discrete logic, embedded data processing circuitry (e.g., microprocessors, microcontrollers and the like) and combinations thereof. For example, certain control circuitry may be implemented using a microprocessor or microcontroller that executes computer program instructions to provide circuitry that implements the control operations described. Such data processing circuitry may be used in conjunction with analog circuitry (e.g., peripheral devices such as analog/digital converters and analog filters) and/or discrete digital circuitry (e.g., logic gates, buffers and the like). Such control operations may also be implemented using similarly functioning analog control circuitry and/or discrete digital circuitry (e.g., logic gates, programmable logic devices, and the like) alone or in combination with data processing circuitry. Signals produced by such circuitry may include analog signals, logic signals and/or digital signals (values) stored in structures such as a register or memory associated with a data processing circuit, such as a microprocessor.

Example embodiments herein with reference to block diagrams and/or flowchart illustrations. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a tangible or non-transitory computer-readable storage medium that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having tangible, non-transitory computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The terms "tangible" and "non-transitory," as used herein, are intended to describe a computer-readable storage medium (or "memory") excluding propagating electromagnetic signals but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which nay be conveyed via a communication medium such as a network and/or a wireless link.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of operating a reduced voltage soft starter (RVSS) that drives a motor, the method comprising:
   sensing a line voltage provided to the RVSS to produce a first voltage signal;
   sensing a current of the motor to generate a current signal;
   transforming the first voltage signal according to an ABC-dq0 transformation at a first angle to generate a component signal;
   scaling the component signal;
   transforming the scaled component signal according to a dq0-ABC transformation at a second angle to generate load-side line-to-neutral voltage signals for respective phases; and
   processing the load-side line-to-neutral voltage signals responsive to the current signal to compensate for switching by the RVSS.

2. The method of claim 1, wherein the current signal comprises respective phase current signals for the respective phases and wherein processing the load-side line-to-neutral voltage signal comprises:
   detecting when the phase currents are within detection windows around zero current levels; and
   notching the load-side line-to-neutral voltage signals based on the phase currents during the detection windows.

3. The method of claim 1:
   wherein scaling the component signal is preceded by generating a root mean square (RMS) component signal from the component signal;
   wherein scaling the component signal comprises scaling the RMS component signal; and
   wherein transforming the scaled component signal according to the dq0-ABC transformation comprises transforming the scaled RMS component signal.

4. The method of claim 1, wherein the first voltage signal represents a line-to-line voltage.

5. The method of claim 1, further comprising generating an estimate of a torque of the motor responsive to the processed load-side line-to-neutral voltage signals.

6. The method of claim 5, further comprising controlling the torque of the motor responsive to the torque estimate.

7. The method of claim 6:
   wherein estimating the torque comprises:
      generating an instantaneous torque estimate; and
      generating an RMS torque estimate from the instantaneous torque estimate; and
   wherein controlling the torque comprises controlling the torque responsive to the RMS torque estimate.

8. A method of operating a reduced voltage soft starter (RVSS) that drives a motor, the method comprising:
   sensing voltages provided to the RVSS to produce first voltage signals;
   sensing phase currents of the motor to generate respective phase current signals for respective phases;
   generating respective load-side line-to-neutral voltage signals for the respective phases from the first voltage signals; and
   detecting when the phase currents are within detection windows around zero current levels responsive to the phase current signals; and
   notching the load-side line-to-neutral voltage signals based on the phase current signals during the detection windows to generate respective notched line-to-neutral voltage signals representative of respective line-to-neutral voltages of the motor.

9. A reduced voltage soft starter (RVSS) comprising:
   a switching circuit configured to selectively couple an AC power source to a motor; and
   a control circuit configured to sense a line voltage provided to the switching circuit to produce a first voltage signal, to sense a current of the motor to generate a current signal, to transform the first voltage signal according to an ABC-dq0 transformation at a first angle to generate a component signal, to scale the component signal, and to transform the scaled component signal according to a dq0-ABC transformation at a second angle to generate load-side line-to-neutral voltage signals for respective phases; and
   wherein the control circuit is configured to generate a second voltage signal by processing the load-side line-to-neutral voltage signals responsive to the current signal to compensate for switching by the switching circuit.

10. The RVSS of claim 9, wherein the current signal comprises respective phase current signals for the respective phases and wherein the control circuit is configured to detect when the phase currents are within detection windows around zero current levels and to notch the load-side line-to-neutral voltage signals based on the phase currents.

11. The RVSS of claim 9, wherein the control circuit is configured to generate a root mean square (RMS) component signal from the component signal, to scale the RMS component signal and to transform the scaled RMS component signal according to the dq0-ABC transformation to generate the load-side line-to-neutral voltage signals.

12. The RVSS of claim 9, wherein the first voltage signal represents a line-to-line voltage.

13. The RVSS of claim 9, wherein the control circuit is further configured to generate an estimate of a torque of the motor responsive to the second voltage signal.

14. The RVSS of claim 13, wherein the control circuit is further configured to control the torque of the motor responsive to the torque estimate.

15. The RVSS of claim 14, wherein the control circuit is configured to generate an instantaneous torque estimate, to generate an RMS torque estimate from the instantaneous torque estimate and to control the torque responsive to the RMS torque estimate.

16. A reduced voltage soft starter (RVSS) comprising:
   a switching circuit configured to selectively couple an AC power source to a motor; and
   a control circuit configured to sense voltages provided to the RVSS to produce first voltage signals, to sense phase currents of the motor to generate respective phase current signals for respective phases, to generate respective load-side line-to-neutral voltage signals for respective phases, to detect when the phase currents are within detection windows around zero current levels responsive to the phase current signals, and to notch the load-side line-to-neutral voltage signals based on the phase current signals to generate respective notched line-to-neutral voltage signals representative of respective line-to-neutral voltages of the motor.

\* \* \* \* \*